(12) United States Patent
Schmidt

(10) Patent No.: US 7,998,569 B2
(45) Date of Patent: Aug. 16, 2011

(54) COMPOSITE ARTICLE AND FABRICATION METHOD

(75) Inventor: Wayde R. Schmidt, Pomfret Center, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/789,787

(22) Filed: May 28, 2010

(65) Prior Publication Data

US 2010/0239842 A1    Sep. 23, 2010

Related U.S. Application Data

(63) Continuation of application No. 11/713,924, filed on Mar. 5, 2007, now Pat. No. 7,749,568.

(51) Int. Cl.
*B32B 3/26* (2006.01)
*C08F 2/48* (2006.01)

(52) U.S. Cl. .......... 428/311.51; 428/312.2; 428/312.6; 428/312.8; 428/316.6; 428/307.7; 428/308.4; 428/689; 428/698; 427/487; 427/508

(58) Field of Classification Search ................ None
See application file for complete search history.

(56) References Cited

U.S. PATENT DOCUMENTS

| | | | |
|---|---|---|---|
| 3,947,550 A | 3/1976 | Fitchmun | |
| 4,126,652 A | 11/1978 | Oohara | |
| 4,589,900 A | 5/1986 | Brennan | |
| 5,116,398 A | 5/1992 | Prewo | |
| 5,281,565 A | 1/1994 | Hecht | |
| 5,292,691 A | 3/1994 | Hecht | |
| 5,494,867 A | 2/1996 | Schwab | |
| 5,698,143 A | 12/1997 | Tani | |
| 5,990,025 A | 11/1999 | Suyama et al. | |
| 6,074,750 A | 6/2000 | Brun et al. | |
| 6,120,840 A | 9/2000 | Paul | |
| 6,627,126 B2 | 9/2003 | Schmidt | |
| 2003/0132558 A1 | 7/2003 | Schmidt et al. | |

FOREIGN PATENT DOCUMENTS

| | | |
|---|---|---|
| EP | 0518589 | 12/1992 |
| EP | 0519643 | 12/1992 |
| EP | 0798280 | 10/1997 |
| EP | 1626036 | 2/2006 |
| EP | 1867619 | 12/2007 |
| EP | 1947072 | 7/2008 |

OTHER PUBLICATIONS

EP Search Report dated Sep. 4, 2009.

*Primary Examiner* — Ling Xu
(74) *Attorney, Agent, or Firm* — Carlson, Gaskey & Olds, P.C.

(57) ABSTRACT

A refractory metal composite article includes a refractory metal ceramic section and a refractory metal ceramic coating disposed directly adjacent to the refractory metal ceramic section. The refractory metal ceramic section and the refractory metal ceramic coating form a composite porous matrix. Each of the refractory metal ceramic section and the refractory metal ceramic coating includes at least one of a refractory metal carbide, a refractory metal silicide, or a refractory metal boride. A solid filler is disposed within pores of the composite porous matrix, and the solid filler is selected from a polymer material, a ceramic material, a metallic material, a glass material, and a glass ceramic material.

18 Claims, 2 Drawing Sheets

COMPOSITE ARTICLE AND FABRICATION METHOD

RELATED APPLICATION

This disclosure is a continuation of U.S. application Ser. No. 11/713,924, filed on Mar. 5, 2007 now U.S. Pat. No. 7,749,568.

BACKGROUND OF THE INVENTION

This disclosure relates to ceramic materials and, more particularly, to refractory metal ceramic composites and methods of making such materials.

Lightweight ceramic materials may have utility in a variety of different applications. Typically, ceramic materials are strong under extreme elevated temperatures and are resistant to intense thermal gradients, chemical attack, and ballistic impacts. For example, many ceramic materials exhibit resistance to temperatures above 1200° C. in combination with one or more other beneficial properties at these high temperatures.

This combination of properties makes ceramic materials attractive for many different applications. However, there are several factors that may somewhat limit the use of ceramic materials. For example, ceramic materials may be difficult to manufacture into useful shapes because they are not easily melted, machined, or formed like other material such as polymers or metals. Additionally, the composition, porosity, and other characteristics of the ceramic must be controlled through the manufacturing in order to obtain desired and useful properties in the final article. Thus, even though the potential benefits of ceramic materials are recognized, new manufacturing processes for producing desired ceramic compositions having useful shapes is desired.

Accordingly, refractory metal composites and methods of manufacturing such composites are needed.

SUMMARY OF THE INVENTION

An example refractory metal composite article includes a refractory metal ceramic section and a refractory metal ceramic coating disposed directly adjacent to the refractory metal ceramic section. The refractory metal ceramic section and the refractory metal ceramic coating form a composite porous matrix. Each of the refractory metal ceramic section and the refractory metal ceramic coating includes at least one of a refractory metal carbide, a refractory metal silicide, or a refractory metal boride. A solid filler is disposed within pores of the composite porous matrix, and the solid filler is selected from a polymer material, a ceramic material, a metallic material, a glass material, and a glass ceramic material.

An example method of manufacturing the refractory metal composite article includes at least partially filling pores within the refractory metal composite article with a solid filler to thereby reduce a porosity of the refractory metal composite article. A monomer may be deposited within the pores at reduced pressure, and subsequently polymerized to provide a polymer filler.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
FIG. 1 shows an example refractory metal composite article.

FIG. 1 illustrates a schematic view of an example refractory metal composite article 10. In the illustrated example, the article 10 is shown generically as having a rectangular shape, however, the refractory metal composite article 10 may be formed in any desired shape for a variety of different uses. For example, the refractory metal composite article 10 may find utility in thermal protection systems for aerospace devices, lightweight armor components, glass matrix composites, ceramic matrix composites, metal matrix composites, organic matrix composites, functionally graded ceramic containing structures, high temperature heat exchangers, high temperature filters, catalytic substrates, reactor supports, environmental barriers, components of laminate structures, and the like. As will be described below, the composition and architecture of the refractory metal composite article 10 are suitable for use in high temperature applications such as those mentioned above.

Figure 2:
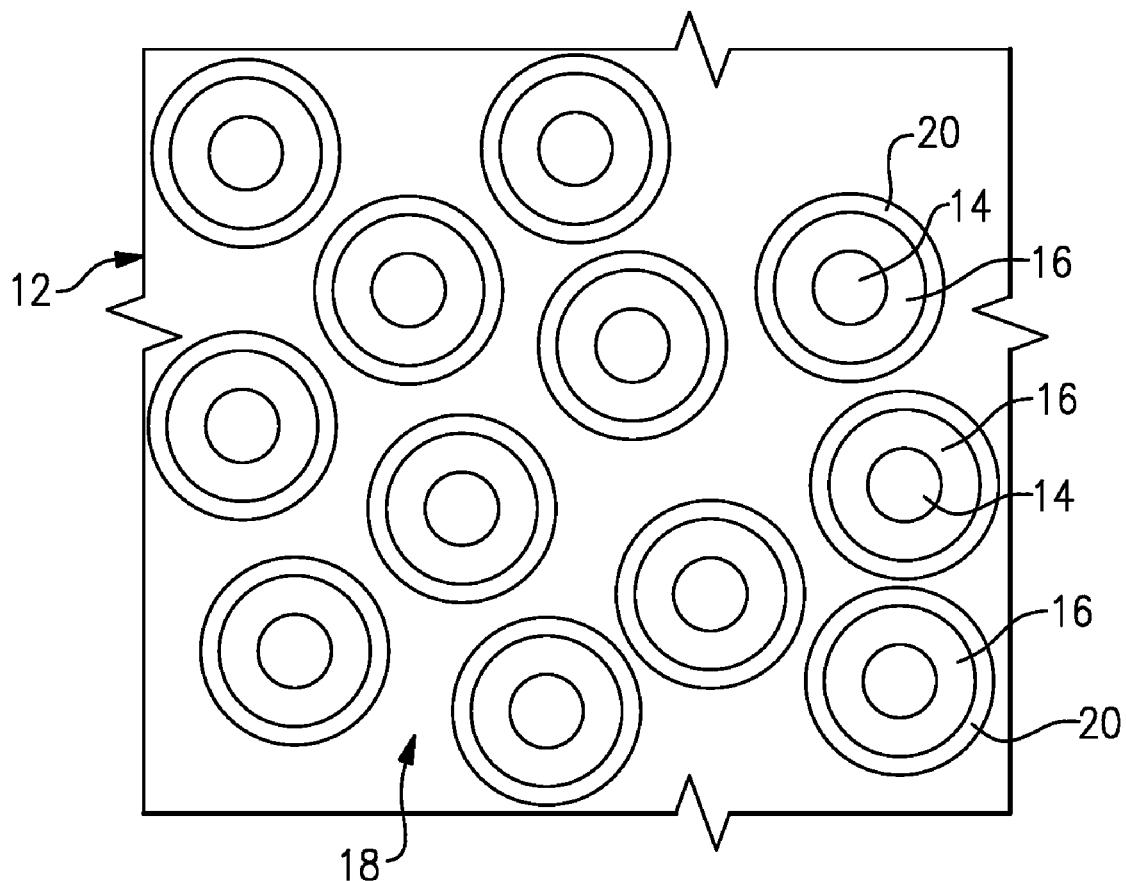
FIG. 2 shows a cross-section of a portion of the example refractory metal composite article.

Referring also to FIG. 2, which schematically illustrates a cross-sectional portion, the refractory metal composite article 10 includes a porous matrix 12 having refractory metal ceramic sections 14 and a refractory metal ceramic coating 16 that coats the refractory metal ceramic sections 14. As can be appreciated from the Figure, the refractory metal ceramic coating 16 is disposed directly adjacent to the refractory metal ceramic section 14 in this example. In the illustrated example, the porous matrix 12 comprises a fibrous structure (FIG. 1) where the refractory metal ceramic sections 14 are interlaced filaments, each having a peripheral filament surface, continuously coated with the refractory metal ceramic coating 16. A network of pores 18 extends between the refractory metal ceramic sections 14 and also between the refractory metal ceramic coating 16. The fibrous, porous structure of the article 10 provides the benefit of having higher surface area and improved flow through the pores 18 compared to conventional foam structures.

A desired amount of solid filler 20 at least partially fills the pores 18 such that the article 10 exhibits a desired amount of residual porosity. The residual porosity may be desired for the benefit of providing a desired amount of thermal insulation, a desired amount of flow volume through the pores 18 of the article 10, or the like. In other examples, the solid filler 20 may completely fill the pores 18 such that there is an insignificant amount of residual porosity or no residual porosity. As shown in FIG. 2, the solid filler is located on the refractory metal ceramic coating 16. However, the solid filler 20 alternatively may partially cover the refractory metal coating 16 or reside as particles within the pores 18, depending upon the selected manufacturing method.

Each of the refractory metal ceramic sections 14, the refractory metal ceramic coating 16, and a solid filler 20 may be selected from a variety of different materials, depending upon the intended use and desired properties of the article 10. For example, the selected materials may form a composite of a refractory metal ceramic and a polymer material, a refractory metal ceramic and a metallic material, a refractory metal ceramic and a glass material, or a refractory metal ceramic and another refractory metal ceramic. Given this description, one of ordinary skill in the art will be able to select suitable materials to meet their particular needs.

The refractory metal ceramic sections 14 and the refractory metal ceramic coating 16 each include at least one refractory metal. For example, the refractory metal is silicon, hafnium, tantalum, boron, tungsten, titanium, niobium, zirconium, molybdenum, vanadium, or a combination thereof. In a further example, the refractory metal of the refractory metal ceramic sections 14 is in carbide form, such as silicon carbide. Likewise, the refractory metal of the refractory metal ceramic coating 16 may also be a refractory metal carbide. Alternatively, the refractory metal ceramic coating 16 may include a refractory metal silicide, or a refractory metal boride.

The solid filler 20 includes any of a variety of different materials, depending upon the intended use and desired properties of the article 10. For example, the solid filler 20 may include a polymer, a metallic material, a ceramic material, or a glass material. In a further example, the ceramic material of the solid filler 20 is a refractory metal carbide, such as any of the above listed refractory metals in carbide form. In yet a further example, the refractory metal carbide is silicon carbide or hafnium carbide or combinations thereof, including solid solutions, which are particularly beneficial under extreme elevated temperatures.

Figure 3:
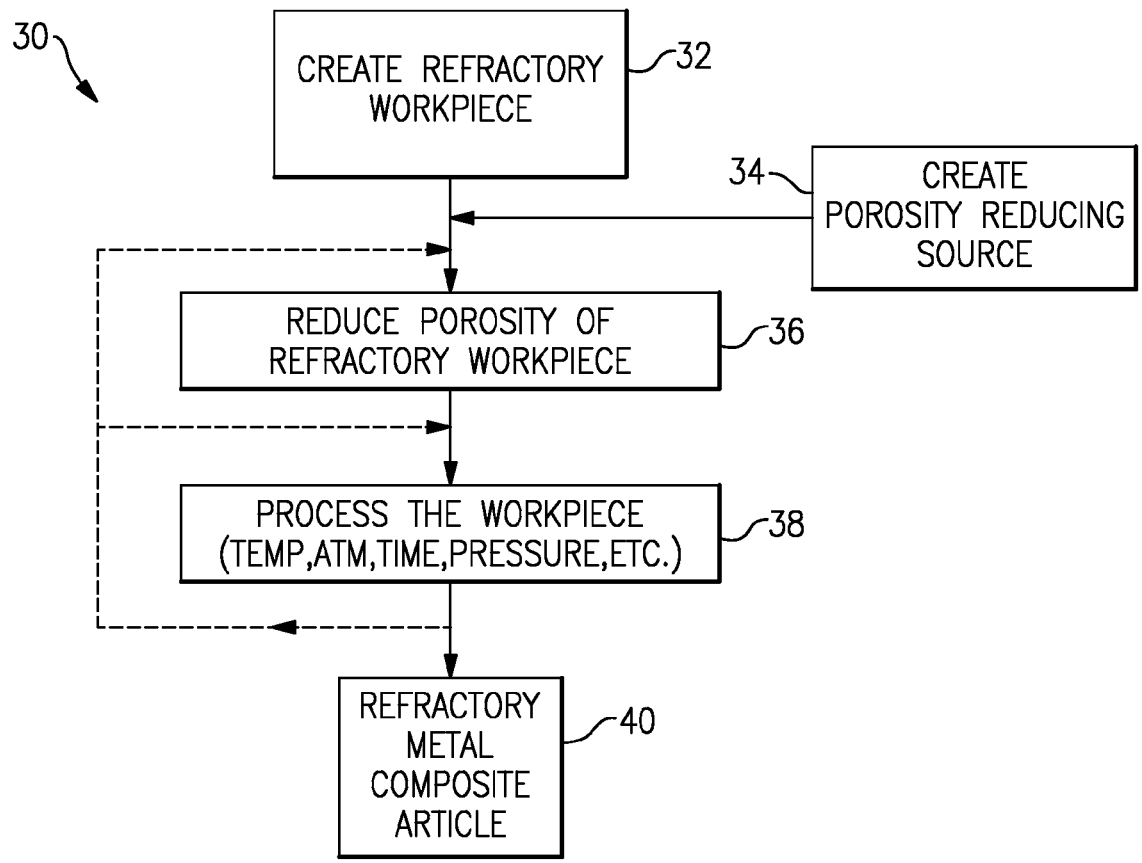
FIG. 3 shows an example method for manufacturing the example refractory metal composite article.

FIG. 3 illustrates an example method 30 for manufacturing the refractory metal composite article 10 of the above examples. At an initial step 32, a refractory workpiece is provided. At step 34, a source of the solid filler 20 is prepared or provided. At step 36, the solid filler 20 is introduced within the network of pores 18 using a process that is suitable for the type of material selected for the solid filler 20. At step 38, the workpiece having reduced porosity is processed under a predetermined temperature, time, pressure atmosphere, etc., to produce the article 10 at final step 40. Optionally, the processing at step 38 and step 36 are repeated (as indicated by the dashed lines in FIG. 3) to further reduce the porosity or deposit different types of the solid filler 20, for example. Several non-limiting examples of the steps 32, 34, 36, and 38 of the method 30 are described below.

In one example, the refractory workpiece includes the refractory metal ceramic sections 14 and the refractory metal ceramic coating 16. For example, commonly owned U.S. application Ser. Nos. 11/455,049 and 11/567,282 disclose methods for producing a workpiece that may be used with the method 30 for manufacturing the article 10. In other examples, the workpiece may be produced using other known methods.

In one example process for forming the workpiece, a starting material such as felt, is used. Felt is readily available, relatively low in cost, and is available in a variety of different densities. The felt may be pre-formed into a desired shape and includes a plurality of interlaced non-woven filaments, or fibers, forming a porous matrix. It is to be understood that other types of fabrics such as woven fabrics, etc., may also be used, depending upon the desired micro-architecture of the article 10. The filaments are formed from a precursor material, such as carbon, but use of boron or silicon is also contemplated. A refractory metal is then deposited within the porous matrix to form a refractory metal coating on the filaments. The refractory metal is in stoichiometric excess of the precursor material of the filaments.

The refractory metal and the precursor material of the filaments are then thermally reacted to form the refractory metal ceramic sections 14 having a fibrous structure similar to that of the felt starting material. The thermal reaction does not require that the refractory metal be melted. Thus, this method of producing the refractory metal ceramic sections 14 provides the benefit of lower processing temperature compared to methods using melting. Depending upon the selected type of precursor material, the refractory metal ceramic sections include refractory metal carbide, boride, or silicide. A portion of the refractory metal remains on the refractory metal ceramic sections 14 because of the stoichiometric excess of refractory metal deposited originally on the filaments.

A second precursor material is then deposited adjacent the remaining refractory metal. For example, the second precursor material includes a pre-ceramic polymer. The pre-ceramic polymer and remaining refractory metal are then thermally reacted to form the refractory metal ceramic coating 16 on the refractory metal ceramic sections 14. The resulting workpiece exhibits a fibrous structure of the refractory metal ceramic sections 14 coated with the refractory metal ceramic coating 16. As can be appreciated, the starting materials are selected such that the above processing results in a desired composition of the workpiece, with a residual porosity due to the porous structure of the starting felt material.

To reduce the porosity to a desired level and form the composite of the article 10, the pores 18 are then at least partially filled with the solid filler 20 at step 36. The selected method for filling the pores 18 depends upon the type of material selected for the solid filler 20. For example, if the solid filler 20 is a polymer material, a process suitable for polymer deposition is selected. If the solid filler 20 is a metallic material, a process suitable for metallic deposition is selected. If the solid filler 20 is a ceramic material, a process suitable for ceramic material deposition is selected, and if the solid filler 20 is a glass material or a glass ceramic (e.g., alumino-silicate glass), a process suitable for glass deposition is selected. Combinations of different types of solid fillers 20 and processes are also possible. A few example processes include, but are not limited to, polymer infiltration pyrolysis, glass transfer molding, chemical vapor deposition, physical vapor deposition, sol-gel, electrophoretic or electrostatic deposition, slurry deposition, dipping, vacuum filtration, freeze casting, polymer melt infiltration, molten metal infiltration, precipitation, polymerization of liquid monomers, and the like. Given this description, one of ordinary skill in the art will recognize other suitable processes to meet their particular needs.

In one example, an epoxy monomer is deposited into the pores of the workpiece (e.g., using polymer infiltration at reduced pressure). The epoxy monomer is then exposed to ultraviolet radiation for a sufficient amount of time at step 38 to polymerize the epoxy and thereby form the solid filler 20. The resulting article 10 is a refractory metal ceramic-epoxy composite. Other monomers can be selected and various polymerization methods can be used, such as heating, catalysis and other wavelengths of radiation.

In another example, a pre-ceramic polymer material having a refractory metal is deposited into the pores of the workpiece. The pre-ceramic polymer is then thermally processed at step 38 to react the polymer and the refractory metal and thereby form a refractory metal ceramic as the solid filler 20. The resulting article 10 is a refractory metal ceramic-refractory metal ceramic composite. The type of refractory metal ceramic produced depends upon the composition of the pre-ceramic polymer and refractory metal. For example, the refractory metal may be any of those listed above and the pre-ceramic polymer may include carbon, boron, silicon, or combinations thereof in polymeric form for reaction with the refractory metal to form carbide, boride, silicide, or combinations thereof, respectively. Alternatively, a pre-ceramic polymer without a refractory filler is used and subsequently converted into a ceramic solid filler 20, such as silicon carbide. Use of pre-ceramic polymers to other silicon-containing phases such as silicon nitride, silicon carbonitride, silicon oxycarbide, silicon oxynitride, silicon-aluminum-oxygen-nitrogen (SiAlON), alumino-silicates and the like is also contemplated. At step 38, the temperature, heating rate, atmospheric composition, pressure, exposure time, exposure to radiation of selected wavelengths, and the like may also be controlled for effective conversion of the pre-ceramic polymer.

In another example, a metal is melted and deposited into the pores of the workpiece. The molten metal is then cooled and solidified at step 38 to thereby form the solid filler 20. The resulting article 10 is a refractory metal ceramic-metal composite. The properties of the metal will preferably be selected to be compatible with the workpiece materials—e.g. it is not desirable to have the molten metal corrode the workpiece.

In another example, a glass material is deposited into the pores of the workpiece using glass transfer molding, for example. The glass material is, in its final form, a solid material having no long range crystalline order. A few example glasses include, but are not limited to, oxide based glasses such as silicates, borates, germinates, and mixtures of these. The glass is then cooled and solidified at step 38 to thereby form the solid filler 20. The resulting article 10 is a refractory metal ceramic-glass composite.

In another example, a combination of more than one of a polymer, a metal, a ceramic, and a glass material is deposited into the pores of the workpiece as described above to form a hybrid refractory metal ceramic composite.

Optionally, the resulting article 10 or workpiece of the above examples may undergo additional processing steps to modify other characteristics, such as crystallinity, grain size, pore size, extent of porosity, etc.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A refractory metal composite article comprising:
   a refractory metal ceramic section comprising a plurality of interlaced filaments, each of the plurality of filaments having a peripheral filament surface;
   a refractory metal ceramic coating continuously coated on the peripheral filament surfaces, the refractory metal ceramic section and the refractory metal ceramic coating forming a composite porous matrix, each of the refractory metal ceramic section and the refractory metal ceramic coating including at least one of a refractory metal carbide, a refractory metal silicide, or a refractory metal boride; and
   a solid filler within pores of the composite porous matrix, and the solid filler is selected from a group consisting of a polymer material, a ceramic material, a metallic material, a glass material, and a glass ceramic material.

2. The refractory metal composite article as recited in claim 1, wherein the refractory metal ceramic section and the refractory metal ceramic coating each include at least one refractory metal selected from silicon, hafnium, tantalum, boron, tungsten, titanium, niobium, zirconium, molybdenum, and vanadium.

3. The refractory metal composite article as recited in claim 1, wherein the refractory metal ceramic section and the refractory metal ceramic coating each include a refractory metal carbide.

4. The refractory metal composite article as recited in claim 1, wherein the refractory metal ceramic section includes a refractory metal carbide and the refractory metal ceramic coating includes at least one of a refractory metal silicide or a refractory metal boride.

5. The refractory metal composite article as recited in claim 1, wherein the solid filler is a polymer.

6. The refractory metal composite article as recited in claim 1, wherein the solid filler is a metallic material.

7. The refractory metal composite article as recited in claim 1, wherein the solid filler is a ceramic material.

8. The refractory metal composite article as recited in claim 7, wherein the ceramic material includes a refractory metal carbide.

9. The refractory metal composite article as recited in claim 8, wherein the refractory metal carbide includes at least one of silicon carbide or hafnium carbide.

10. The refractory metal composite article as recited in claim 1, wherein the solid filler includes at least one of a glass material or a glass ceramic material.

11. The refractory metal composite article as recited in claim 1, wherein the solid filler partially fills the pores such that a residual porosity remains.

12. The refractory metal composite as recited in claim 1, wherein the solid filler is the polymer material, and the polymer material is epoxy.

13. The refractory metal composite article as recited in claim 1, wherein the solid filler is the polymer material, and the polymer material is a preceramic polymer.

14. The refractory metal composite article as recited in claim 13, wherein the preceramic polymer includes an element selected from a group consisting of boron, silicon and combinations thereof.

15. The refractory metal composite article as recited in claim 1, wherein the refractory metal ceramic coating is the refractory metal silicide.

16. The refractory metal composite article as recited in claim 1, wherein the refractory metal ceramic coating is the refractory metal boride.

17. A method of manufacturing a refractory metal composite article having a refractory metal ceramic section and a refractory metal ceramic coating that form a composite porous matrix, the method comprising:
   (a) at least partially filling pores within the refractory metal composite article with a solid filler selected from a group consisting of a polymer material, a ceramic material, a metallic material, a glass material, and a glass ceramic material, to thereby reduce a porosity of the refractory metal composite article, the refractory metal ceramic section comprising a plurality of interlaced filaments, each of the plurality of filaments having a peripheral filament surface, each of the refractory metal ceramic section and the refractory metal ceramic coating including at least one of a refractory metal carbide, a refractory metal silicide, or a refractory metal boride such that the refractory metal ceramic coating is continuously coated on the peripheral filament surfaces.

18. The method as recited in claim 17, including depositing a monomer within the pores at reduced pressure, and subsequently polymerizing the monomer using ultraviolet light.

* * * * *